(12) United States Patent
Ishizuka et al.

(10) Patent No.: US 7,405,252 B2
(45) Date of Patent: Jul. 29, 2008

(54) VINYL CHLORIDE RESIN COMPOSITION

(75) Inventors: Hidehiro Ishizuka, Saitama (JP); Daisuke Takeda, Saitama (JP); Yutaka Yonezawa, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 10/581,923

(22) PCT Filed: Oct. 28, 2004

(86) PCT No.: PCT/JP2004/016002

§ 371 (c)(1),
(2), (4) Date: Jun. 7, 2006

(87) PCT Pub. No.: WO2005/056672

PCT Pub. Date: Jun. 23, 2005

(65) Prior Publication Data

US 2007/0100049 A1    May 3, 2007

(30) Foreign Application Priority Data

Dec. 8, 2003   (JP)   ............... 2003-408400

(51) Int. Cl.
*C08K 3/32* (2006.01)
(52) U.S. Cl. ............... 524/417; 524/493; 524/567; 524/117
(58) Field of Classification Search ............ 524/417, 524/493, 567, 117, 119
See application file for complete search history.

(56) References Cited

U.S. PATENT DOCUMENTS 4,463,113 A   7/1984  Nakahara et al.

2004/0166163 A1 *  8/2004  Kimura et al. ............ 424/486

FOREIGN PATENT DOCUMENTS

| JP | 58-001736 | | 1/1983 |
|---|---|---|---|
| JP | 59-113046 | | 6/1984 |
| JP | 6-73254 | | 3/1994 |
| JP | 10-251444 | | 9/1998 |
| JP | 10-251445 | * | 9/1998 |
| JP | 10-251470 | * | 9/1998 |
| JP | 10-251526 | | 9/1998 |
| JP | 22-251469 | * | 9/1998 |
| JP | 10-265677 | | 10/1998 |
| JP | 10-265678 | | 10/1998 |
| JP | 2001-220464 | | 8/2001 |

OTHER PUBLICATIONS

JP 2001-158823 A (Asahi Kasei Corp.), Jun. 12, 2001, claims; Par. Nos. [009], [0015], [0016], [0020]; examples (Family: none).
JP 62-20538 A (Sakai Chemical Industry Co., Ltd.), Jun. 29, 1987, Claims, p. 2, upper right column, line 19 to lower left column, line 8; p. 3, upper right column, lines 13 to 20 (Family :none).
JP 10-251469 A (Asahi Denka Kogyo Kabushiki Kaisha), Sep. 22, 1998, Claims; Par Nos. [0038] to [0040] (Family : none).
JP 10-251445 A (Kabushiki Kaisha Nagano Sanyo Kasei), Sep. 22, 1998), Claims (Family: none).

* cited by examiner

*Primary Examiner*—Ling-Sui Choi
(74) *Attorney, Agent, or Firm*—Young & Thompson

(57) ABSTRACT

A vinyl chloride resin composition comprising 100 parts by mass of a vinyl chloride resin and a co-ground mixture of (a) 0.001 to 10 parts by mass of at least one member selected from the group consisting of an organic phosphoric ester compound and a metal salt thereof and (b) 0.001 to 10 parts by mass of a grinding aid. The composition is excellent in transparency, heat stability, and heat discoloration resistance.

14 Claims, No Drawings

VINYL CHLORIDE RESIN COMPOSITION

BACKGROUND OF THE INVENTION

1. Field of the Invention

This invention relates to a vinyl chloride resin composition characterized by containing a co-ground mixture of at least one member selected from the group consisting of an organic phosphoric ester compound and its metal salt and a grinding aid.

2. Description of the Related Art

Vinyl chloride resins are used in a wide range of applications; for they are inexpensive and can have their hardness adjusted easily by using a plasticizer.

However, vinyl chloride resins have a light/heat stability problem. It is noted that a vinyl chloride resin is liable to decompose primarily due to dehydrohalogenation during heat molding processing or in use. Hence there have been attempts to improve stability of vinyl chloride resins by addition of a metal compound as a main stabilizer in combination with various co-stabilizers.

A problem is that some of the co-stabilizers have poor compatibility with a vinyl chloride resin only to yield moldings with deteriorated physical properties such as transparency. Another problem is that a poorly dispersible co-stabilizer can cause sudden blackening in spots on the resulting moldings, which is called zinc burning.

Patent Document: 1 discloses an antimicrobial composition for polymeric materials that contains a phosphoric ester compound or a metal salt thereof. The publication gives no mention nor suggestion that the phosphoric ester compound or its metal salt is effective in improving transparency of polymers.

Patent Document: 2 teaches that a phosphoric ester metal salt is usable as a nucleating agent for crystalline resins. A nucleating agent is to become crystalline nuclei of a crystalline resin and produces its effect as being retained inside resin crystals. There is no suggestion of using a phosphoric ester metal salt for noncrystalline polymers.

| | |
|---|---|
| Patent Document: 1 | JP-A-2001-220464 |
| Patent Document: 2 | JP-A-58-1736 |

BRIEF SUMMARY OF THE INVENTION

The outstanding problem to be solved lies in that conventional combinations of a stabilizer and a co-stabilizer for vinyl chloride resins have not yet provided a vinyl chloride resin composition satisfactory in such physical properties as transparency, heat stability, and heat discoloration resistance on account of poor compatibility or dispersibility of co-stabilizers.

Accordingly, an object of the present invention is to provide a vinyl chloride resin composition excellent in transparency, heat stability, and heat discoloration resistance.

As a result of extensive investigations, the present inventors have found that addition of a co-ground mixture of an organic phosphoric ester compound or its metal salt and a grinding aid to a vinyl chloride resin yields a vinyl chloride resin composition having excellent transparency and high heat stability withstanding heat processings and free from discoloration that would damage the product qualities.

Having been completed based on the above findings, the present invention provides a vinyl chloride resin composition comprising 100 parts by mass of a vinyl chloride resin and a co-ground mixture of (a) 0.001 to 10 parts by mass of at least one member selected from the group consisting of an organic phosphoric ester compound and a metal salt thereof and (b) 0.001 to 10 parts by mass of a grinding aid.

DETAILED DESCRIPTION OF THE PREFERRED EMBODIMENTS

The vinyl chloride resin composition of the present invention will be described in detail based on its preferred embodiments.

The vinyl chloride resin that can be used in the vinyl chloride resin composition of the invention includes chlorine-containing resins, such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleic ester copolymers, vinyl chloride-methacrylic ester copolymers, vinyl chloride-acrylonitrile copolymers, and vinyl chloride-vinyl ether copolymers; polyblends of two or more of the chlorine-containing resins; and polyblends, block copolymers or graft copolymers of the chlorine-containing resins and chlorine-free synthetic resins, such as acrylonitrile-styrene copolymers, ethylene-vinyl acetate copolymers, ethylene-ethyl (meth)acrylate copolymers, and polyester. Among them polyvinyl chloride is particularly preferred for the vinyl chloride resin composition of the present invention.

The vinyl chloride resin composition of the invention contains at least one member selected from the group consisting of an organic phosphoric ester compound and a metal salt thereof (hereinafter also referred to as component (a)). The organic phosphoric ester compound and its metal salt are preferably represented by general formula (I):

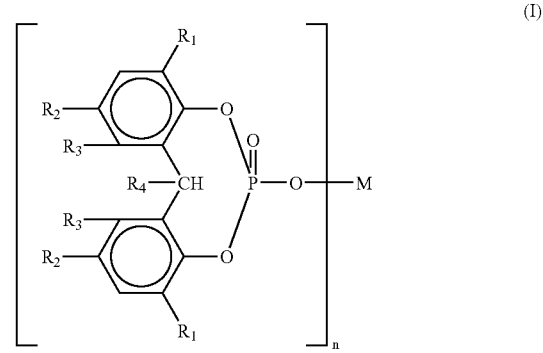

wherein $R_1$, $R_2$, and $R_3$ each represent a hydrogen atom or a straight-chain or branched alkyl group having 1 to 18 carbon atoms; $R_4$ represents a hydrogen atom or a methyl group; n represents 1 or 2; M represents a hydrogen atom or an alkali metal atom when n is 1, or M represents an alkaline earth metal atom or a zinc atom when n is 2.

In general formula (I), the straight-chain or branched alkyl group having 1 to 18 carbon atoms as represented by $R_1$, $R_2$ and $R_3$ includes methyl, ethyl, propyl, isopropyl, butyl, sec-butyl, tert-butyl, amyl, tert-amyl, hexyl, octyl, 2-ethylhexyl, isooctyl, tert-octyl, nonyl, decyl, dodecyl, tridecyl, isotridecyl, tetradecyl, hexadecyl, and octadecyl. For use in the present invention, $R_1$ and $R_2$ are each preferably a tert-butyl group, and $R_3$ and $R_4$ are each preferably a hydrogen atom.

In general formula (I), the alkali metal atom represented by M includes sodium, potassium, and lithium, and the alkaline earth metal includes calcium, magnesium, barium, and strontium. Compounds of general formula (I) in which M is an alkali metal atom or a zinc atom are particularly effective and therefore preferred.

Exemplary of the organic phosphoric ester compounds or metal salts represented by general formula (I) are the following compound Nos. 1 to 8.

Compound No. 1:

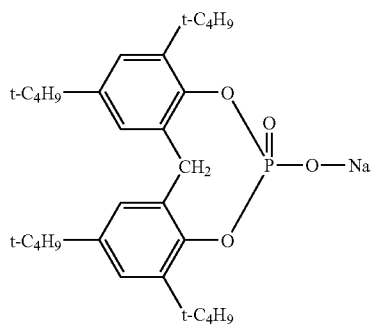

Compound No. 2:

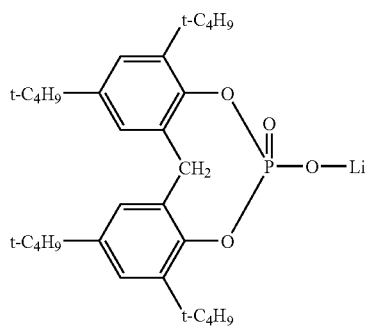

Compound No. 3:

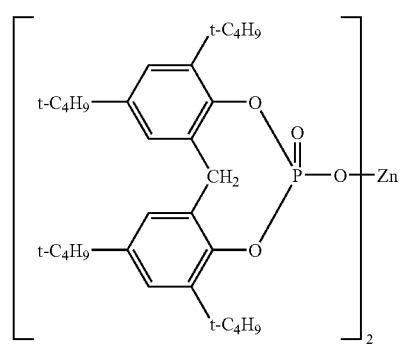

Compound No. 4:

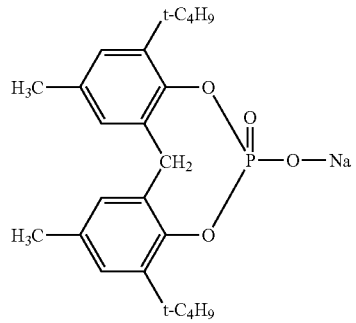

Compound No. 5:

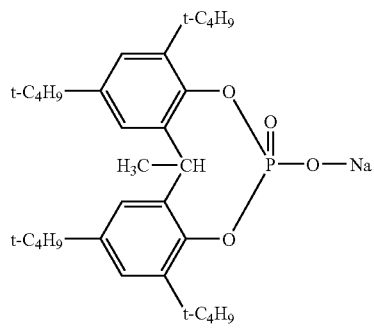

Compound No. 6:

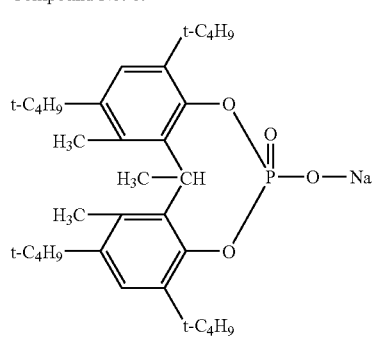

Compound No. 7:

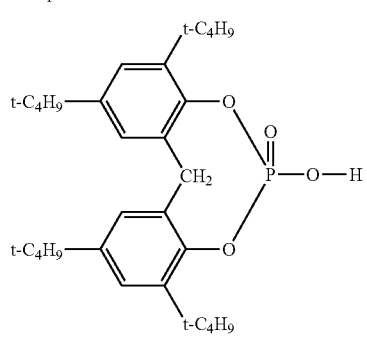

-continued

Compound No. 8:

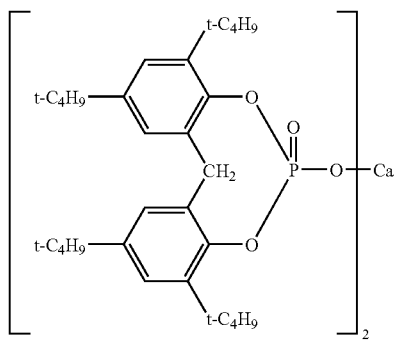

Component (a) is used in an amount of 0.001 to 10 parts by mass, preferably 0.5 to 3 parts by mass, per 100 parts by mass of the vinyl chloride resin. In amounts less than 0.001 parts by mass, sufficient effects are not produced. Addition of more than 10 parts by mass does not result in appreciable further improvement but is wasteful.

The organic phosphoric ester compounds and metal salts thereof are very stable compounds. The component (a) is used as a co-ground mixture with a grinding aid (hereinafter also referred to as component (b)) so as to have improved dispersibility in the vinyl chloride resin. Although the particle size of the co-ground mixture is not particularly limited, an average particle size is preferably from 0.1 to 100 μm, more preferably 0.1 to 10 μm, from the standpoint of not impairing the physical properties of the vinyl chloride resin composition. The co-ground mixture can be compounded into the vinyl chloride resin as such or, if desired, may be supported by various carriers or dispersed in a solvent or a liquid additive into a dispersion or a paste.

The grinding aid that can be used in the vinyl chloride resin composition of the invention includes aliphatic organic acid metal salts, hydrotalcite, powdered silicas, vinyl chloride resins, perchlorates, magnesium oxide, magnesium hydroxide, calcium oxide, calcium hydroxide, calcium silicate, amorphous aluminosilicates, and alkali metal and/or alkaline earth metal aluminosilicates having a zeolite structure. They can be used as a combination of two or more thereof. It is preferred to use, among them, at least one member selected from the group consisting of an aliphatic organic acid metal salt, hydrotalcite, a powdered silica, and a vinyl chloride resin.

The aliphatic organic acid metal salt includes normal, acid, basic, and overbased salts of aliphatic organic acids with the group Ia metals (e.g., sodium, potassium, and lithium), the group IIa metals (e.g., calcium, magnesium, barium, and strontium) or the group IIb metals (e.g., zinc).

The aliphatic carboxylic acids constituting the aliphatic organic acid metal salts include caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, ricinoleic acid, linoleic acid, oleic acid, arachic acid, behenic acid, erucic acid, brassidic acid, and like acids; and naturally occurring mixtures of these acids, such as animal fatty acids, coconut oil fatty acids, tung oil fatty acids, soybean oil fatty acids, and cotton seed oil fatty acids.

Of the aliphatic organic acid metal salts preferred is at least one compound selected from the group consisting of lithium, calcium, magnesium, and zinc salts of stearic acid. It is particularly preferred to use a zinc salt of stearic acid.

Hydrotalcite as mentioned above is a complex salt compound composed of magnesium and aluminum or a complex salt compound composed of zinc, magnesium, and aluminum which are represented by general formula (II) shown below. The compounds may be freed of water of crystallization.

$$Mg_{x1}Zn_{x2}Al_2.(OH)_{2(x1+x2)+4}.(CO_3)_{1,y/2}(ClO_4)_y.mH_2O \quad (II)$$

wherein x1, x2, and y each represent a number satisfying the following conditions; m represents 0 or any integer; $0 \leq x2/x1 < 10$, $2 \leq x1+x2 < 20$, and $0 \leq y \leq 2$.

The hydrotalcite may be a commercially available product, including Alkamizer 1, Alkamizer 2, Alkamizer 4, Alkamizer 5, Alkamizer 7, DHT-4A (all available from Kyowa Chemical Industry Co., Ltd.), with DHT-4A being preferred.

The powdered silicas include precipitated silica (called white carbon) and fumed silica (Aerosil). The silica may have been surface treated or finely ground.

The vinyl chloride resins as a grinding aid include chlorine-containing resins, such as polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleic ester copolymers, vinyl chloride-methacrylic ester copolymers, vinyl chloride-acrylonitrile copolymers, and vinyl chloride-vinyl ether copolymers; polyblends of two or more of the chlorine-containing resins; and polyblends, block copolymers or graft copolymers of the chlorine-containing resins and chlorine-free synthetic resins, such as acrylonitrile-styrene copolymers, ethylene-vinyl acetate copolymers, ethylene-ethyl (meth)acrylate copolymers, and polyester. Among them polyvinyl chloride is particularly suitable.

Component (b) is used in an amount of 0.001 to 10 parts by mass of the vinyl chloride resin. To further ensure transparency of the resulting vinyl chloride resin composition, a preferred amount is 0.05 to 1.5 parts by mass. The component (a) to component (b) ratio is preferably 1:0.01 to 2.0 by part by mass.

Components (a) and (b) are co-ground by means of a mortar, a ball mill, a vibration ball mill, a roller mill, a rod mill, a tube mill, a conical mill, a high-swing ball mill, a pin mill, a hammer mill, a knife hammer mill, an attrition mill, a jet mill, a counter jet mill, a spiral jet mill, a Jetmizer, a Micronizer, a Nanomizer, a Majac mill, a Micro atomizer, a Micron mill, a rotary cutter, an impact mill, a compression shear mill, a Henschel mixer, and so on. A grinding method using a roller mill, a ball mill, a jet mill or a Henschel mixer is preferred. The co-grinding system preferably has an inner temperature of 25° to 35° C., and the co-grinding time is preferably 1 to 3 hours.

The vinyl chloride resin composition of the invention can contain various additives commonly added to vinyl chloride resins. The additives include phenol, phosphorus or sulfur based antioxidants, metal soap stabilizers, metal alkylphosphate stabilizers, inorganic metal salt stabilizers, perchlorate compounds, organotin stabilizers, polyol compounds, β-diketone compounds, epoxy compounds, plasticizers, blowing agents, UV absorbers, hindered amine light-stabilizers, antimicrobial agents, fillers, coloring agents/pigments, crosslinking agents, antistatics, anti-fog additives, lubricants, processing aids, flame retardants, anti-plate-out agents, surface treating agents, fluorescent agents, metal deactivators, photo-deterioration inhibitors, parting agents, and reinforcing agents. While the amounts of the additives are decided as appropriate to the purpose of addition, a preferred total amount of the additives is up to 60 parts by mass per 100 parts by mass of the vinyl chloride resin. The additives may be co-ground together with components (a) and (b).

Examples of the phenol antioxidants are tetrakis[3-(4-hydroxy-3,5-di-t-butylphenyl)propionyloxymethyl]methane, 6-di-t-butyl-p-cresol, 4,4'-butylidenebis(2,6-di-t-butylphenol), 4,4'-butylidenebis(6-t-butyl-3-methylphenol), 2,6-diphenyl-4-octadecyloxyphenol, stearyl(3,5-di-t-butyl-4-hydroxyphenyl)propionate, distearyl (3,5-di-t-butyl-4-hydroxybenzyl)phosphonate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane, triethylene glycol bis[β-(3-t-butyl-4-hydroxy-5-methylphenyl)propionate], and bisphenol A.

Examples of the phosphorus antioxidants are triphenyl phosphite, tris(2,4-di-t-butylphenyl) phosphite, tris(2,5-di-t-butylphenyl)phosphite, tris(nonylphenyl)phosphite, tris(dinonylphenyl)phosphite, tris(mono/di-mixed nonylphenyl) phosphite, diphenyl acid phosphite, 2,2'-methylenebis(4,6-di-t-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol)-1,4-cyclohexanedimethyl diphosphite, bis(2,4-di-tert-butylphenyl) pentaerythritol diphosphite, bis(2,5-di-t-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra($C_{12\text{-}15}$ mixed alkyl)-4,4'-isopropylidenediphenyl phosphite, bis[2,2'-methylenebis(4,6-diamylphenyl)]-isopropylidenediphenyl phosphite, tetratridecyl-4,4'-butylidenebis(2-t-butyl-5-methylphenol) diphosphite, hexa(tridecyl)-1,1,3-tris(2-methyl-5-tert-butyl-4-hydroxyphenyl)butane triphosphite, tetrakis(2,4-di-t-butylphenyl)biphenylene diphosphonite, tris(2-[(2,4,7,9-tetrakis-t-butyldibenzo[d,f][1,3,2]dioxaphosphepin-6-yl)oxy] ethyl)amine, 9,10-dihydro-9-oxa-10-phosphaphenanthrene-10-oxide, and 2-butyl-2-ethylpropanediol 2,4,6-tri-t-butylphenol monophosphite.

Examples of the sulfur antioxidants include dialkyl thiodipropionates, such as a dilauryl, dimyristyl, myristylstearyl or distearyl ester of thiodipropionic acid; and polyol β-alkylmercaptopropionic acid esters, such as pentaerythritol tetra (β-dodecylmercaptopropionate).

The metal soap stabilizers include normal salts, acid salts, basic salts, and overbased salts of the group Ia metals (e.g., sodium, potassium, and lithium), the group IIa metals (e.g., calcium, magnesium, barium, and strontium) or the group IIb metals (e.g., zinc) with aliphatic or aromatic carboxylic acids. They are usually used as a combination of a group IIa metal salt and a group IIb metal salt.

The aliphatic or aromatic carboxylic acids providing the metal soap stabilizers include caproic acid, caprylic acid, pelargonic acid, 2-ethylhexylic acid, capric acid, neodecanoic acid, undecylic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid, cinnamic acid, and like acids; naturally occurring mixtures of these acids, such as animal fatty acids, coconut oil fatty acids, tung oil fatty acids, soybean oil fatty acids, and cotton seed oil fatty acids; benzoic acid, p-t-butylbenzoic acid, ethylbenzoic acid, isopropylbenzoic acid, toluic acid, xylylic acid, salicylic acid, 5-t-octylsalicylic acid, naphthenic acid, and cyclohexanecarboxylic acid.

Examples of the metal alkylphosphate stabilizers include mono- and/or dioctylphosphates, mono- and/or didodecylphosphates, mono- and/or dioctadecylphosphates, mono- and/or dilaurylphosphates, and mono- and/or distearylphosphates of the group Ia metals (e.g., sodium, potassium, and lithium), the group IIa metals (e.g., calcium, magnesium, barium, and strontium) or the group IIb metals (e.g., zinc). These salts may be any of normal salts, acid salts, and basic salts.

Examples of the inorganic metal salt stabilizers include oxides or hydroxides of the group Ia metals (e.g., sodium, potassium, and lithium), the group IIa metals (e.g., calcium, magnesium, barium, and strontium) or the group IIb metals (e.g., zinc); basic inorganic acids salts of these metals, such as carbonates, phosphates, phosphites, silicates, borates, and sulfates; aluminosilicates of these metals which have a zeolite crystal structure; hydrotalcite and hydrotalcite-like compounds.

The perchlorate compounds include perchlorates of the group Ia metals (e.g., sodium, potassium, and lithium), the group IIa metals (e.g., calcium, magnesium, barium, and strontium), the group IIb metals (e.g., zinc), ammonia, and organic amines; and inorganic porous substances having adsorbed perchloric acid.

The organotin stabilizers include methylstannoic acid, butylstannoic acid, octylstannoic acid, dimethyltin oxide, dibutyltin oxide, dioctyltin oxide, dimethyltin sulfide, dibutyltin sulfide, dioctyltin sulfide, monobutyltin oxide sulfide, methylthiostannoic acid, butylthiostannoic acid, octylthiostannoic acid, dibutyltin dilaurate, dibutyltin distearate, dioctyltin dioleate, dibutyltin basic laurate, dibutyltin dicrotonate, dibutyltin bis(butoxydiethylene glycol maleate), dibutyltin methyl octyl neopentyl glycol maleate, dibutyltin isooctyl 1,4-butanediol maleate, dibutyltin dimethacrylate, dibutyltin dicinnamate, dioctyltin bis(oleyl maleate), dibutyltin bis(stearyl maleate), dibutyltin itaconate, dioctyltin maleate, dimethyltin dicrotonate, dioctyltin bis(butyl maleate), dibutyltin dimethoxide, dibutyltin dilauroxide, dioctyltin ethylene glycoxide, pentaerythritol dibutyltin oxide condensate, dibutyltin bis(lauryl mercaptide), dimethyltin bis(stearyl mercaptide), monobutyltin tris(lauryl mercaptide), dibutyltin β-mercaptopropionate, dioctyltin β-mercaptopropionate, dibutyltin mercaptoacetate, monobutyltin tris(isooctyl mercaptoacetate), monooctyltin tris(2-ethylhexyl mercaptoacetate), dibutyltin bis(isooctyl mercaptoacetate), dioctyltin bis (isooctyl mercaptoacetate), dioctyltin bis(2-ethylhexyl mercaptoacetate), dimethyltin bis(isooctyl mercaptoacetate), dimethyltin bis(isooctyl mercaptopropionate), monobutyltin tris(isooctyl mercaptopropionate), bis[monobutyldi(isooctoxycarbonylmethylenethio)tin]sulfide, bis[dibutylmono (isooctoxycarbonylmethylenethio)tin]sulfide, monobutylmonochlorotin bis(isooctyl mercaptopropionate), monobutylmonochlorotin bis(isooctyl mercaptoacetate), monobutylmonochlorotin bis(lauryl mercaptide), butyltin bis (ethyl cellosolve maleate), bis(dioctyltin butyl maleate)maleate, bis(methyltin diisooctyl thioglycolate)disulfide, bis(methyl/dimethyltin mono/diisooctyl thioglycolate)disulfide, bis (methyltin diisooctyl thioglycolate)trisulfide, bis(butyltin diisooctyl thioglycolate)trisulfide, and 2-butoxycarbonylethyltin tris(butyl thioglycolate).

Examples of the polyol compounds include glycerol, trimethylolpropane, ditrimethylolpropane, pentaerythritol, dipentaerythritol, polypentaerythritol, a mono- or dipentaerythritol stearic acid half ester, bis(dipentaerythritol)adipate, glycerol, mannitol, sorbitol, and tris(2-hydroxyethyl) isocyanurate; and partial esters thereof with aliphatic or aromatic mono- or polycarboxylic acids.

Examples of the β-diketone compounds include dibenzoylmethane, benzoylacetone, pivaloylbenzoylmethane, palmitoylbenzoylmethane, stearoylbenzoylmethane, caproylbenzoylmethane, di-t-butylbenzoylmethane, benzoylcyclohexanone, and dehydroacetic acid; and complex salts of these diketones with a metal, e.g., zinc, calcium, magnesium, copper, cobalt or nickel.

Examples of the epoxy compounds include epoxidized animal or plant oils, such as epoxidized soybean oil, epoxidized linseed oil, epoxidized tung oil, epoxidized fish oil, epoxidized beef tallow oil, epoxidized castor oil, and epoxidized safflower oil; epoxidized stearic acid methyl, butyl, 2-ethylhexyl or stearyl ester, epoxidized polybutadiene, tris (epoxypropyl)isocyanurate, epoxidized tall oil fatty acid esters, epoxidized linseed oil fatty acid esters, bisphenol A diglycidyl ether, vinylcyclohexene diepoxide, dicyclohexene diepoxide, and 3,4-epoxycyclohexyl methylepoxycyclohexanecarboxylate.

The plasticizers include alkyl esters of aliphatic or aromatic polycarboxylic acids, such as dibutyl phthalate, dioctyl phthalate, didecyl phthalate, trioctyl trimellitate, tetraoctyl pyromellitate, tetraoctylbiphenyl tetracarboxylate, dioctyl adipate, diisononyl adipate, dioctyl sebacate, dioctyl azelate, and trioctyl citrate; phosphoric esters, such as triphenyl phosphate, tricresyl phosphate, and trixylyl phosphate; polyesters obtained by condensing aliphatic or aromatic polycarboxylic acids and glycols and, if desired, blocking the terminal with monohydric alcohols and/or monocarboxylic acids; and chlorinated paraffin.

The blowing agents include azo blowing agents, such as azodicarboxylic acid amide, azobisisobutyronitrile, diazodiaminobenzene, and diethyl azodicarboxylate; nitroso blowing agents, such as dinitrosopentamethylenetetramine and n,n'-dinitrosopentamethylenetetramine; hydrazide blowing agents, such as benzenesulfonyl hydrazide, p-toluenesulfonyl azide, bis(benzenesulfonyl hydrazide)ether, and p,p'-oxybis (benzenesulfonyl hydrazide); semicarbazide blowing agents, such as toluenesulfonyl semicarbazide; triazine blowing agents, such as trihydrazinotriazine; and decomposing blowing agents, such as sodium hydrogencarbonate, ammonium carbonate, ammonium hydrogencarbonate, ammonium nitrite, azide compounds, and sodium borohydride.

Examples of the UV absorbers include 2-hydroxybenzophenones, such as 2,4-dihydroxybenzophenone, 2-hydroxy-4-methoxybenzophenone, 2-hydroxy-4-octyloxybenzophenone, and 5,5'-methylenebis(2-hydroxy-4-methoxybenzophenone); 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl)phenol, and polyethylene glycol ester of 2-(2-hydroxy-3-tert-butyl-5-carboxyphenyl)benzotriazole; benzoates, such as phenyl salicylate, resorcinol monobenzoate, 2,4-di-tert-butylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; and cyanoacrylates, such as ethyl α-cyano-β,β-diphenylacrylate and methyl-2-cyano-3-methyl-3-(p-methoxyphenyl)acrylate.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6-pentamethyl-4-piperidyl)sebacate, tetrakis(2,2,6, 6-tetramethyl-4-piperidyl)butanetetracarboxylate, tetrakis(1, 2,2,6,6-pentamethyl-4-piperidyl)butanetetracarboxylate, bis (1,2,2,6,6-pentamethyl-4-piperidyl)di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6, 6-tetraethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazin-6-yl]-1,5,8,12-tetraazadodecane, 1,5,8,12-tetrakis[2,4-bis(N-butyl-N-(1,2, 2,6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-yl-amino] undecane, and 1,6,11-tris[2,4-bis(N-butyl-N-(1,2,2,6,6-pentamethyl-4-piperidyl)amino)-s-triazin-6-yl-amino] undecane.

The vinyl chloride resin composition of the invention can contain known inorganic and/or organic antimicrobial agents. The antimicrobial agents can be used as an appropriate combination of two or more thereof to enhance the effect and/or broaden the antimicrobial spectrum. Commonly used antimicrobial agents imparting antibacterial and/or antifungal properties to plastics can be used. What we call antifingals are included therein.

The inorganic antimicrobial agents include metals capable of imparting antibacterial and/or antifungal properties, such as silver and copper, and their oxides, hydroxides, phosphates, thiosulfates, and silicates, and inorganic compounds having such metals or metal compounds carried thereon. They are exemplified by silver or copper zeolites, silver zirconium phosphate, silver hydroxyapatite, silver phosphate glass, silver phosphate ceramics, silver calcium phosphate, etc. Commercially available products of these antimicrobial agents can be utilized.

The organic antimicrobial agents include nitrogen/sulfur-containing ones, bromine-containing ones, nitrogen-containing ones, pyrithione and its metal salts, and phenol-containing organic compounds. The nitrogen/sulfur-containing organic antimicrobial agents are exemplified by alkylene bisthiocyanate compounds, such as methylene bisthiocyanate; isothiazoline compounds, such as 5-chloro-2-methyl-4-isothiazolin-3-one, 2-octyl-4-isothiazolin-3-one, 4,5-dichloro-2-octyl-4-isothiazolin-3-one, and N-butyl-1,2-benzoisothiazolin-3-one; sulfonamide compounds, such as chloramine T and N,N-dimethyl-N'-(fluorodichloromethylthio)-N'-phenylsulfamide; thiazole compounds, such as 2-(4-thiocyanomethylthio)benzothiazole and 2-mercaptobenzothiazole; 2-(4-thiazolyl)benzimidazole, 3,5-dimethyl-1,3,5-2H-tetrahydrothiadiazine-2-thione, N-(fluorodichloromethylthio)phthalimide, and dithio-2,2'-bis(benzmethylamide). The bromine-containing organic antimicrobial agents include organic bromonitro compounds, such as 2-bromo-2-nitropropane-1,3-diol, 1,1-dibromo-1-nitro-2-propanol, 2,2-dibromo-2-nitroethanol, 2-bromo-2-nitro-1,3-diacetoxypropane, β-bromo-β-nitrostyrene, and 5-bromo-5-nitro-1,3-dioxane; organic bromocyano compounds, such as 2,2-dibromo-3-cyanopropionamide; bromoacetic acid compounds, such as 1,2-bis(bromoacetoxy)ethane, 1,4-bis(bromoacetoxy)-2-butene, and bromoacetamide; and organic bromosulfone compounds, such as bis(tribromomethyl)sulfone. The nitrogen-containing organic antimicrobial agents include s-triazine compounds, such as hexahydro-1,3,5-triethenyl-s-triazine and hexahydro-1,3,5-tris(2-hydroxyethyl)-s-triazine; halogenated oxime compounds, such as N,4-dihydroxy-α-oxobenzeneethaneimidoyl chloride and α-chloro-o-acetoxybenzaldoxime; chlorinated isocyanuric acid compounds, such as trichloroisocyanurates and sodium dichloroisocyanurate; quaternary ammonium compounds, such as benzalkonium chloride and decalinium chloride; carbamic acid compounds such as 2-methylcarbonylaminobenzimidazole; imidazole compounds, such as 1-[2-(2,4-dichlorophenyl)]-2'-[(2,4-dichlorophenyl)methoxy]ethyl-3-(2-phenylethyl)-1H-imidazolium chloride; amide compounds, such as 2-chloroacetamide; amino alcohol compounds, such as N-(2-hydroxypropyl)aminomethanol and 2-(hydroxymethylamino)ethanol; and nitrile compounds, such as 2,4,5,6-tetrachloroisophthalonitrile. The phenol-containing organic compounds include methyl p-hydroxybenzoate, ethyl p-hydroxybenzoate, isopropyl p-hydroxybenzoate, butyl p-hydroxybenzoate, and benzyl p-hydroxybenzoate.

Applications of the vinyl chloride resin composition of the present invention include constructive materials, such as, floor materials, ceiling materials, and stair rails; footwear, such as shoes, shoe insoles, and sandals; appliances, such as telephone sets, facsimiles, personal computers, TV sets, and refrigerators; vehicle-related articles, such as train straps; kitchen utensils, such as food containers, chopping boards, strainers, and drainers; bathroom accessories, such as bath tubs, basins, stools, soap dishes, and shower curtains; furniture; stationery; medical articles; and artificial leather.

The vinyl chloride resin composition of the invention is also formulated into coatings, such as solution coatings as dissolved in a solvent, aqueous coatings as dispersed in water, and powder coatings, which can be applied to any substrates including metal, wood, concrete, plastics, and ceramics.

EXAMPLES

The present invention will now be illustrated in greater detail with reference to Examples, but the invention should not be construed as being limited thereto.

Compound Nos. 1 and 3 used below are compounds listed above as examples of the organic phosphoric ester compound or a metal salt thereof represented by general formula (I). In Examples and Comparative Examples, all the grinding and co-grinding operations were carried out using a roller mill at an inner temperature of 30° C. for 1 hour to give particles having an average particle size ranging from 0.1 to 1 μm.

Examples 1 to 13 and Comparative Examples 1 to 8

A vinyl chloride resin composition having the formulation shown in Tables 1 through 5 was kneaded in a roll kneader at 170° C. for 7 minutes and calendered at 180° C. to prepare 0.5 mm thick sheets. Two of the resulting sheets were superposed on each other and pressed at 180° C. for 5 minutes to obtain a 0.7 mm thick pressed sheet. A 5 cm side square specimen was cut out of the pressed sheet. The specimen was put in a Geer oven at 190° C. to determine a blackening time as a measure of heat stability.

Separately, two of the resulting sheets (0.5 mm thick) were superposed on each other and pressed at 180° C. for 5 minutes and 30 minutes to prepare 1.0 mm thick pressed sheets. A 5 mm by 10 mm specimen was cut out of each of the pressed sheets and measured for yellowness index with a Hunter color difference meter as a measured of initial discoloration.

Furthermore, three of the 0.5 mm thick sheets were superposed one on top of another and pressed at 180° C. for 5 minutes to prepare a 2.0 mm thick pressed sheet. A 5 mm by 10 mm specimen was cut out of the pressed sheet and measured for haze (JIS K7105) as a measure of transparency.

The results obtained are shown in Tables 1 to 5.

TABLE 1

| | Example | | | | | |
|---|---|---|---|---|---|---|
| | 1-1 | 1-2 | 2-1 | 2-2 | 3 | 4 |
| Polyvinyl Chloride Resin A[1)] | | | 100 | | | |
| Dioctyl Phthalate | | | 50 | | | |
| Epoxidized Soybean Oil | | | 5.0 | | | |
| Compound No. 1 | 2.9* | 2.9* | 2.9* | 2.9* | 2.9* | 2.9* |
| Compound No. 3 | | | | | | |
| Hydrotalcite[2)] | 1.0* | 1.0* | 1.0* | 1.0* | 1.0* | 0.5* |
| Zinc Stearate | 0.3* | 0.3* | 0.3* | 0.3* | 0.3* | 0.3* |
| Magnesium Stearate | | | | | | 0.5* |
| Calcium Stearate | | | | | | |
| Butyl p-Hydroxybenzoate | 0.2* | 0.2 | | | | |
| Benzyl p-Hydroxybenzoate | | | 0.2* | 0.2 | | 0.2 |
| Zinc Pyrithione | | | | | 0.2* | |
| Heat Stability (Blackening Time: min) | 105 | 105 | 105 | 105 | 105 | 75 |
| Discoloration (YI) Pressing Time: 5 mins | 23.5 | 24.5 | 24 | 25 | 21 | 40 |
| Pressing Time: 30 mins | 31 | 33 | 31 | 32 | 30 | 58 |
| Transparency (Haze: %) | 15.6 | 15.8 | 15.5 | 15.7 | 15.3 | 25 |

Note:
The components marked with an asterisk were co-ground before compounding.
[1)]TK-1300, from Shin-Etsu Chemical Co., Ltd
[2)]DHT-4A, from Kyowa Chemical Industry Co., Ltd.

TABLE 2

| | Example | | | | | |
|---|---|---|---|---|---|---|
| | 5 | 6 | 7 | 8 | 9-1 | 9-2 |
| Polyvinyl Chloride Resin A | | | 100 | | | |
| Dioctyl Phthalate | | | 50 | | | |

TABLE 2-continued

|  | Example | | | | | |
| --- | --- | --- | --- | --- | --- | --- |
|  | 5 | 6 | 7 | 8 | 9-1 | 9-2 |
| Epoxidized Soybean Oil | 5.0 | | | | | |
| Compound No. 1 | 2.9* |  | 2.9* | 2.9* | 0.9* | 1.4* |
| Compound No. 3 |  | 2.9* |  |  |  |  |
| Hydrotalcite | 0.5* | 1.0* | 1.0 | 1.0* | 1.0 | 1.0 |
| Zinc Stearate | 0.3* | 0.3* | 0.3* | 0.3 | 0.3* | 0.3* |
| Magnesium Stearate |  |  |  |  |  |  |
| Calcium Stearate | 0.5* |  |  |  |  |  |
| Butyl p-Hydroxybenzoate |  |  |  |  |  |  |
| Benzyl p-Hydroxybenzoate | 0.2 | 0.2 | 0.2 | 0.2 | 0.2 | 0.2 |
| Zinc Pyrithione |  |  |  |  |  |  |
| Heat Stability (Blackening Time: min) | 90 | 90 | 90 | 90 | 75 | 90 |
| Discoloration (YI) Pressing Time: 5 mins | 40 | 26 | 25.4 | 25 | 19 | 21 |
| Pressing Time: 30 mins | 56 | 32 | 31.8 | 32 | 27 | 29 |
| Transparency (Haze: %) | 22 | 15 | 16.3 | 15.5 | 9.6 | 11.3 |

Note:
The components marked with an asterisk were co-ground before compounding.

TABLE 3

|  | Example | | | | | |
| --- | --- | --- | --- | --- | --- | --- |
|  | 9-3 | 10-1 | 10-2 | 11 | 12 | 13 |
| Polyvinyl Chloride Resin A | 100 | | | | | |
| Dioctyl Phthalate | 50 | | | | | |
| Epoxidized Soybean Oil | 5.0 | | | | | |
| Compound No. 1 | 1.8* | 2.9* | 2.9* | 2.9* | 2.9* | 2.9* |
| Compound No. 3 |  |  |  |  |  |  |
| Hydrotalcite | 1.0 | 1.0 | 1.0 | 1.0* | 1.0* | 1.0 |
| Zinc Stearate | 0.3* | 0.7* | 1.1* | 0.3* | 0.3* | 0.3* |
| Magnesium Stearate |  |  |  |  |  |  |
| Calcium Stearate |  |  |  |  |  |  |
| Stearoylbeazoylmethane |  |  |  | 0.1* | 0.1 |  |
| Fumed Silica[3] |  |  |  | 0.05* | 0.05 |  |
| Polyvinyl Chloride Resin B[4] |  |  |  | 0.1* | 0.1 |  |
| Butyl p-Hydroxybenzoate |  |  |  |  |  |  |
| Benzyl p-Hydroxybenzoate | 0.2 | 0.2 | 0.2 |  |  |  |
| Zinc Pyrithione |  |  |  | 0.2* | 0.2* | 4.0[5] |
| Heat Stability (Blackening Time: min) | 90 | 90 | 90 | 105 | 105 | 105 |
| Discoloration (YI) Pressing Time: 5 mins | 22 | 23 | 22.7 | 22 | 22 | 23 |
| Pressing Time: 30 mins | 31 | 31.5 | 31.1 | 31 | 31 | 33 |
| Transparency (Haze: %) | 13.5 | 17.7 | 18 | 15.5 | 15.5 | 15.7 |

Note:
The components marked with an asterisk were co-ground before compounding.
[3] Aerosil 200, from Nippon Aerosil Co., Ltd.
[4] M-800, from V-Tech Corp.
[5] PVC/dioctyl phthalate paste (5 wt %)

TABLE 4

|  | Comparative Example | | | |
| --- | --- | --- | --- | --- |
|  | 1 | 2 | 3 | 4 |
| Polyvinyl Chloride Resin A | 100 | | | |
| Dioctyl Phthalate | 50 | | | |
| Epoxidized Soybean Oil | 5.0 | | | |
| Compound No. 1 | 2.9** | 2.9** | 2.9** | 2.9** |
| Compound No. 3 |  |  |  |  |
| Hydrotalcite | 1.0 | 1.0 | 1.0 | 0.5 |
| Zinc Stearate | 0.3 | 0.3 | 0.3 | 0.3 |
| Magnesium Stearate |  |  |  | 0.5 |
| Calcium Stearate |  |  |  |  |
| Butyl p-Hydroxybenzoate | 0.2 |  |  |  |
| Benzyl p-Hydroxybenzoate |  | 0.2 |  | 0.2 |
| Zinc Pyrithione |  |  | 0.2 |  |
| Heat Stability (Blackening Time: min) | 90 | 90 | 90 | 75 |
| Discoloration (YI) Pressing Time: 5 mins | 42 | 41 | 35 | 43 |
| Pressing Time: 30 mins | 69 | 68 | 60 | 147 |
| Transparency (Haze: %) | 19.8 | 19.4 | 18.2 | 20 |

Note:
The components marked with a double asterisk were ground alone before being compounded.

TABLE 5

|  | Comparative Example | | | |
| --- | --- | --- | --- | --- |
|  | 5 | 6 | 7 | 8 |
| Polyvinyl Chloride Resin A | 100 | | | |
| Dioctyl Phthalate | 50 | | | |
| Epoxidized Soybean Oil | 5.0 | | | |
| Compound No. 1 | 2.9** | 2.9*** | 2.9*** | 2.9** |
| Compound No. 3 |  |  |  |  |
| Hydrotalcite | 0.5 | 1.0 | 1.0* |  |
| Zinc Stearate | 0.3 | 0.3 | 0.3* | 0.3 |
| Magnesium Stearate |  |  |  |  |
| Calcium Stearate | 0.5 |  |  |  |
| Butyl p-Hydroxybenzoate |  |  |  |  |
| Benzyl p-Hydroxybenzoate | 0.2 | 0.2 | 0.2 | 0.2 |
| Zinc Pyrithione |  |  |  |  |
| Heat Stability (Blackening Time: min) | 90 | 90 | 90 | 45 |
| Discoloration (YI) Pressing Time: 5 mins | 41 | 30 | 24 | 42 |
| Pressing Time: 30 mins | 147 | 146 | 140 | 60 |
| Transparency (Haze: %) | 21 | 42.7 | 42.3 | 20 |

Note:
The components marked with an asterisk mark were co-ground before compounding.
The components marked with a double asterisk were ground alone before compounding.
The components marked with a triple asterisk had an average particle size of 10 μm.

It is obvious from the above results that the vinyl chloride resin composition having incorporated therein a co-ground mixture of at least one member selected from the group consisting of an organic phosphoric ester compound and its metal salt and a grinding aid has high transparency and high heat stability and undergoes no discoloration that would damage the product qualities.

INDUSTRIAL APPLICABILITY

According to the present invention, addition of a co-ground mixture of an organic phosphoric ester compound or its metal salt and a grinding aid to a vinyl chloride resin results in the provision of a vinyl chloride resin composition having excellent transparency and high heat stability withstanding heat processings and free from discoloration that would damage the product qualities.

The invention claimed is:

1. A vinyl chloride resin composition, comprising:
100 parts by mass of a vinyl chloride resin; and
a co-ground mixture obtained by co-grinding a mixture of:
(a) 0.001 to 10 parts by mass of at least one member selected from the group consisting of an organic phosphoric ester compound and a salt thereof represented by general formula (I):

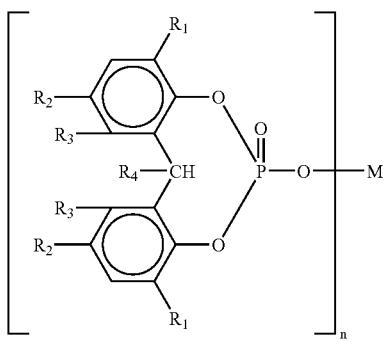

wherein $R_1$, $R_2$, and $R_3$ each represent a hydrogen atom or a straight-chain or branched alkyl group having 1 to 18 carbon atoms; $R_4$ represents a hydrogen atom or a methyl group; n represents 1 or 2; M represents a hydrogen atom or an alkali metal atom when n is 1, or M represents an alkaline earth metal atom or a zinc atom when n is 2, and
(b) 0.001 to 10 parts by mass of a grinding aid.

2. The vinyl chloride resin composition according to claim 1, wherein M is an alkali metal atom or a zinc atom.

3. The vinyl chloride resin composition according to claim 1, wherein $R_1$ and $R_2$ are each a tert-butyl group, and $R_3$ and $R_4$ are each a hydrogen atom.

4. The vinyl chloride resin composition according to claim 1, wherein M is an alkali metal atom or a zinc atom.

5. The vinyl chloride resin composition according to claim 1, wherein the grinding aid is at least one member selected from the group consisting of an aliphatic organic acid metal salt, hydrotalcite, a powdered silica, and a vinyl chloride resin.

6. The vinyl chloride resin composition according to claim 5, wherein the aliphatic organic acid metal salt is a lithium salt, calcium salt, magnesium salt or zinc salt of stearic acid.

7. The vinyl chloride resin composition according to claim 1, wherein the co-ground mixture has an average particle size of 0.1 to 100 μm.

8. The vinyl chloride resin composition according to claim 2, wherein the grinding aid is at least one member selected from the group consisting of an aliphatic organic acid metal salt, hydrotalcite, a powdered silica, and a vinyl chloride resin.

9. The vinyl chloride resin composition according to claim 3, wherein the grinding aid is at least one member selected from the group consisting of an aliphatic organic acid metal salt, hydrotalcite, a powdered silica, and a vinyl chloride resin.

10. The vinyl chloride resin composition according to claim 2, wherein the co-ground mixture has an average particle size of 0.1 to 100 μm.

11. The vinyl chloride resin composition according to claim 3, wherein the co-ground mixture has an average particle size of 0.1 to 100 μm.

12. The vinyl chloride resin composition according to claim 4, wherein the co-ground mixture has an average particle size of 0.1 to 100 μm.

13. The vinyl chloride resin composition according to claim 5, wherein the co-ground mixture has an average particle size of 0.1 to 100 μm.

14. The vinyl chloride resin composition according to claim 6, wherein the co-ground mixture has an average particle size of 0.1 to 100 μm.

* * * * *